(12) United States Patent
Linnberg

(10) Patent No.: US 9,469,227 B2
(45) Date of Patent: Oct. 18, 2016

(54) REAR MOUNTED VEHICLE SEAT SUSPENSION

(71) Applicant: Sears Manufacturing Co., Davenport, IA (US)

(72) Inventor: Jeffrey Donald Linnberg, Blue Grass, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 15/150,789

(22) Filed: May 10, 2016

(65) Prior Publication Data

US 2016/0250955 A1    Sep. 1, 2016

Related U.S. Application Data

(63) Continuation of application No. 14/068,015, filed on Oct. 31, 2013, now abandoned.

(51) Int. Cl.

| B60N 2/38 | (2006.01) |
|---|---|
| B60N 2/50 | (2006.01) |
| B60N 2/52 | (2006.01) |
| B60N 2/54 | (2006.01) |

(52) U.S. Cl.
CPC ............ *B60N 2/502* (2013.01); *B60N 2/38* (2013.01); *B60N 2/509* (2013.01); *B60N 2/522* (2013.01); *B60N 2/544* (2013.01)

(58) Field of Classification Search
CPC ...... B60N 2/502; B60N 2/504; B60N 2/505; B60N 2/509; B60N 2/522; B60N 2/544; B60N 2/38
USPC .............. 297/216.16, 216.17, 308
See application file for complete search history.

(56) References Cited

U.S. PATENT DOCUMENTS

| 3,572,828 | A | * | 3/1971 | Lehner | A47C 31/00 248/567 |
|---|---|---|---|---|---|
| 3,954,298 | A | * | 5/1976 | Lowe | B60N 2/504 248/598 |
| 4,561,621 | A | * | 12/1985 | Hill | B60N 2/06 248/397 |
| 5,176,356 | A | * | 1/1993 | Lorbiecki | B60N 2/504 248/157 |
| 5,601,338 | A | * | 2/1997 | Wahls | A47C 7/14 116/285 |
| 5,676,336 | A | * | 10/1997 | Nefy | B64D 25/04 244/118.6 |
| 9,067,512 | B2 | * | 6/2015 | Cailleteau | B60N 2/045 |

FOREIGN PATENT DOCUMENTS

| EP | 1050428 A1 | * | 11/2000 | ............. B60N 2/502 |
|---|---|---|---|---|
| EP | 2192001 A1 | * | 6/2010 | ............. B60N 2/502 |

OTHER PUBLICATIONS

European examination report dated May 11, 2016, Application No. 14189736.3, 5 pages.
Japan examination report dated Jun. 28, 2016, Application No. 2014-217004, 4 pages (translation also attached, 4 pages).

* cited by examiner

*Primary Examiner* — Ryan Kwiecinski
(74) *Attorney, Agent, or Firm* — Lane & Waterman LLP

(57) ABSTRACT

A seat suspension system for a vehicle comprising a system frame, an elongated seat bracket having one end pivotably mounted to said system frame and the opposite end adapted to support a seat, and a dampening device attached between said system frame and a location on said seat bracket between said one end and said opposite end thereof.

4 Claims, 5 Drawing Sheets

REAR MOUNTED VEHICLE SEAT SUSPENSION

RELATED APPLICATION

This application is a continuation of U.S. patent application Ser. No. 14/068,015 filed on Oct. 31, 2013.

BACKGROUND

The present disclosure relates to suspension systems for vehicle seats, particularly suited for tractors and other off-road equipment.

Certain vehicles, and particularly off-road equipment, often utilize seat suspensions to provide a comfortable ride for the operators of such vehicles. In an effort to reduce the stress and fatigue on the operator and to provide comfort to the operator of such vehicles, suspension systems are employed to reduce vibration and limit vertical acceleration experienced by the operators. These suspension systems must be configured to account for many factors such as the wide range of vibration and movements induced by different terrains, varying operator masses and even the seating position and orientation of the operator. A suspension system that can reduce vibration and vibration acceleration over various terrains for a range of operators is very desirable, particularly where the operator must be seated within the vehicle for long periods of time.

Many of these vehicles have relatively small cabins for housing the operator and operator controls. As such, the seats are often straddle mounted over the transmission of the vehicle. This straddle-mount position limits the space or envelop available for the more typical suspension system located under the seat. Consequently, the suspension system is often rear mounted, that is located behind the seat. A typical behind-the-seat suspension system uses springs attached to the operator seat to soften rebounds and absorb vibration caused by the terrain.

Traditionally, behind-the-seat suspension systems affix one end of one or more springs to a frame and the other end directly to the seat back. The placement of the springs in this manner typically creates a 1:1 ratio between the compression/extension of the spring and the vertical translation of the operator's seat. That is, if the seat moves down an inch, the springs also extend downwardly approximately an inch. Many of these systems also employ a dampening device or shock absorber that also has an approximate 1:1 ratio with the movement of the seat. Seats with a 1:1 ratio between the seat and suspension spring movements tend to have ride performance characteristics that underperform, particularly in certain governmental certification testing programs. Additionally, the springs in such systems tend to undergo significant wear thereby requiring frequent repair and replacement of the suspension components. These problems with prior rear mounted suspension systems are further aggravated as the mass of the vehicle operator increases.

There is a need therefore, for a rear mounted or behind-the-seat suspension system that can accommodate a range of operator masses and that can reduce vibration and vibration acceleration for a wide range of terrains.

SUMMARY

In one aspect, a suspension system comprises a system frame and an elongated bracket mounted to the system frame at one end and adapted to support a seat at the opposite end. The suspension system also includes a dampening device attached between the system frame and the bracket at a place on the bracket between the end mounted to the system frame and the opposite end which is adapted to support a seat. In one embodiment, the dampening device includes a shock absorber. In another embodiment, the dampening device may be a spring or multiple springs. In a further embodiment, the dampening device may include both a spring and a shock absorber. In yet another embodiment, the dampening device is attached to the seat bracket at a location that is nearer to the end of the bracket that is mounted to the seat frame than to the opposite end. In one aspect, the suspension system has a suspension rate of approximately 19.3 pounds per inch. In other embodiments, the suspension rate is between 10 and 25 pounds per inch but can also be between 5 and 50 pounds per inch.

The above-described features and advantages, as well as others, will become more readily apparent to those of ordinary skill in the art by reference to the following detailed description and accompanying drawings. While it would be desirable to provide a suspension system that includes one or more of these advantageous features, the teachings disclosed herein extend to those embodiments which fall within the scope of the appended claims, regardless of whether they accomplish one or more of the above-mentioned advantages.

DETAILED DESCRIPTION

Figure 1:
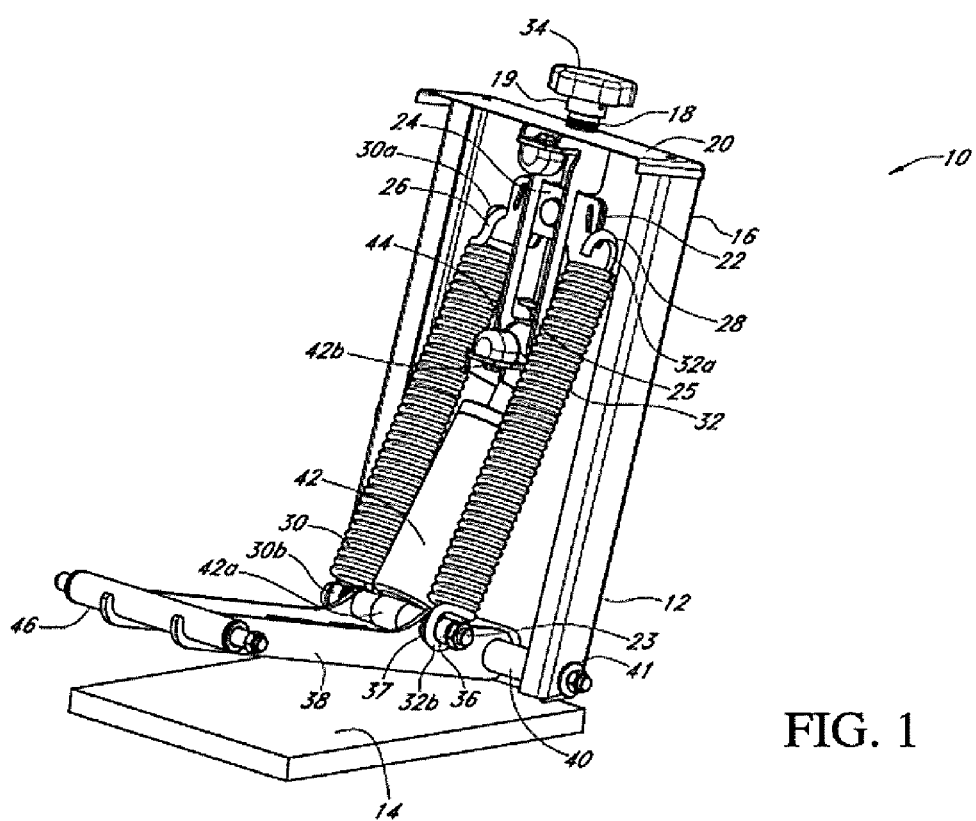
FIG. 1 is a perspective view of the seat suspension system in accordance with the disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

One type of seat suspension system according to the present disclosure is shown in FIG. 1. The suspension system 10 includes a system frame 12 which includes a lower frame 14 and upper frame 16. The lower frame 14 is adapted to be mounted to the vehicle and the upper frame 16 is attached to the lower frame by the pivot rod 40, together forming the skeletal framework for the suspension system. The upper frame includes a loading rod 18 inserted vertically through a top plate 20 of the upper frame. The upper end of the loading rod passes through a bushing 19 affixed to the top plate 20 of the upper frame. The opposite end of the loading rod is connected to a spring carrier 22 to permit adjustment of the height of the carrier relative to the frame. In one embodiment, the spring carrier includes a dowel 24 seated within a bore in the spring carrier in which the dowel includes a cross bore for receiving the loading rod there-through. A support disc 25 is positioned below the spring carrier to support the carrier and is threadedly engaged to threads at the lower end of the loading rod. Rotation of the loading rod thus raises or lowers the support disc, and consequently the spring carrier relative to the system frame 12.

Figure 4:
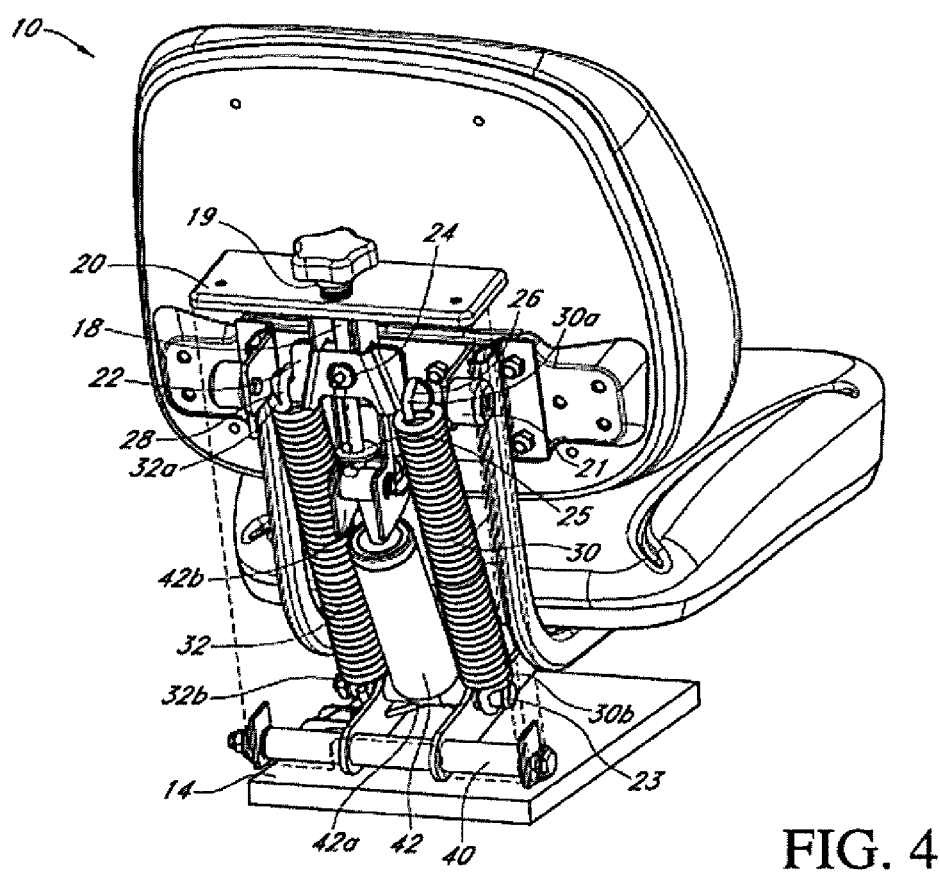
FIG. 4 is a rear perspective view of the seat suspension system with the seat attached.

As can be seen in FIG. 4, the spring carrier further includes a spring hook 26 and a spring hook 28, in which each spring hook 26, 28 is adapted to engage one end of a spring. in this disclosure, the end 30*a* of spring 30 is attached to the spring hook 26 and the end 32*a* of spring 32 is attached to the spring hook 28. It is understood that the spring carrier may be configured to engage additional springs on each side and that two springs are used for illustrative purposes only. The other end of the loading rod 18 is provided with a knob 34 (as shown on FIG. 4) to turn the loading rod as described above. The spring carrier can thus be adjusted to different positions by turning the knob. It will be appreciated that the adjustment of the position of the spring carrier will thereby load or unload the springs depending on the direction the knob is turned when the other end of the springs are attached to the suspension system, as described below. This pre-loading adjustment of the springs is done to adjust the suspension system to accommodate the mass (weight) of the operator as will be explained later.

Figure 2:
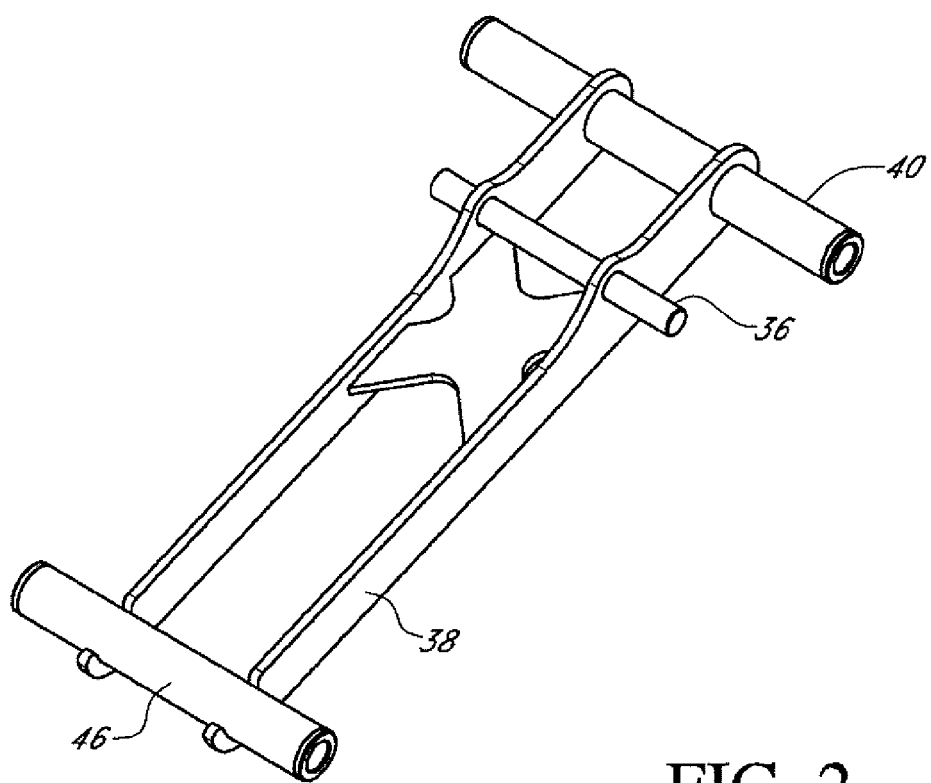
FIG. 2 is a perspective view depicting the lever bracket of the suspension system.

Referring now to FIGS. 1, 2 and 4, the opposite ends 30*b*, 32*b* of the springs are attached to a mounting rod 36. The mounting rod is contained within a lever bracket 38 which is affixed to the system frame by virtue of the pivot rod 40. In this disclosure, the pivot rod is fastened to the upper frame and the lower frame at each end of the pivot rod, such as by a snap-ring 41 or other suitable fastener. The pivot rod passes through the lever bracket such that the lever bracket is rotatable around the axis of the pivot rod. The mounting rod 36 is also assembled to the lever bracket in a similar manner, such as by snap-rings 37 or other suitable fastener. In the illustrated embodiment, the opposite ends 30*b*, 32*b* of the springs are wrapped around a bushing 23 between the outboard sides of the lever bracket and the snap rings 37.

A shock absorber 42 or other dampening device may also be incorporated in the suspension system described in this disclosure. One end 42*a* of the shock absorber can be mounted to the center of the mounting rod while the opposite end 42*b* is mounted to a damper mount 44 that is fastened to the upper frame 16. Unlike the spring carrier, the damper mount 44 is at a fixed vertical location on the upper frame. The ends 42*a*, 42*b* of the shock absorber are pivotably mounted at each end to accommodate rotation. The damper is used to help provide comfort to the operator by diminishing vibration and vibration acceleration. In this disclosure the shock absorber is passive in nature, but other types of shock absorbers are contemplated including active and semi-active.

Figure 3:
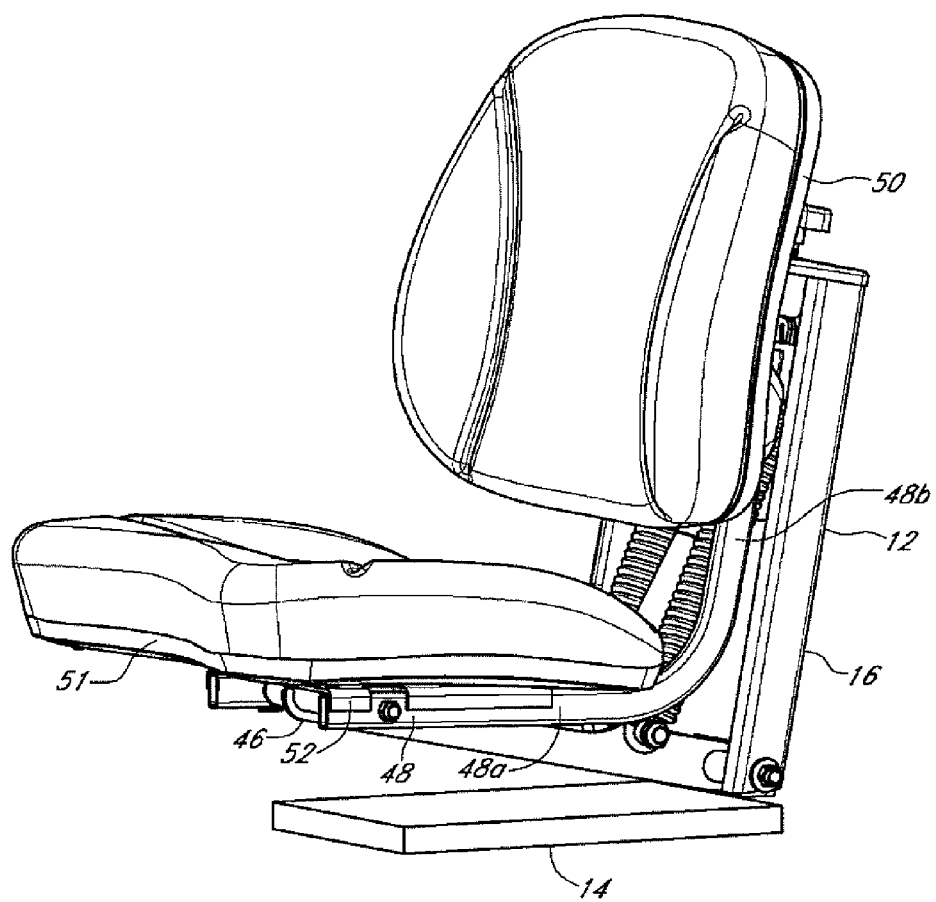
FIG. 3 is a front perspective view of the seat suspension system with the seat attached.

A seat pivot rod 46 is fastened to the free end of the lever bracket 38 distal from the pivot rod 40. The seat pivot rod is configured to be rotatably fastened to the seat frame 48 as seen in FIG. 3. The length of the lever bracket from pivot rod 40 to seat pivot rod 46 is thus sized so that it can accommodate a seat frame 48. The length of the lever bracket from pivot rod 40 to seat pivot rod 46 also contributes to the overall suspension rate of the system as will be explained later. The seat frame is generally of an angled or L-shaped design to accommodate a seat back 50 and a seat bottom 51. The seat back height may be adjustable with respect to the seat frame as is also commonly known. The seat frame 48 includes a bottom portion 48*a* that is movably connected to the seat pivot rod 46 and a rear portion 48*b* that is slidably connected to the upper frame 16 using rollers 21. In one embodiment, these rollers 21 allow the seat frame 48, 48*a* and 48*b* to move relative to the upper frame 16.

Referring now to FIGS. 1, 3, 4 and 5, it can be understood then that when an operator sits in the seat, a downward force will be exerted on the seat bottom 51 and cushion support pan 52 which in turn exerts a force on the seat frame 48 which will in turn exert a downward force on the seat pivot rod 46. As the seat moves downward a downward force is exerted on the free end of the lever bracket, causing the bracket to pivot about the pivot rod 40. The downward pivoting of the bracket extends the springs 30, 32 which are attached to the mounting rod 36. It will be appreciated that the moment arm for the seat bottom 51 is greater than the moment arm for the spring mounts, since the seat bottom is supported at the free end of the lever bracket 38 and the springs 30, 32 are mounted closer to the pivot rod. Thus, the seat will move downwardly a distance d2 that is greater than the amount the springs will be stretched d1. In one particular embodiment, the mounting rod 36 for the springs has a moment arm of about 2.75 inches and the moment arm for the seat pivot rod 46 is about 11.9 inches. Thus, the installation ratio (described in more detail below), which is the ratio of spring movement to seat movement, in this disclosure is not 1:1 as in the prior art but in one embodiment is approximately 1:4.3. That is, for every 4.3 inches the seat moves, the springs will stretch approximately 1 inch. It can be understood that different ratios can be used with different spring configurations to create desirable suspension characteristics. A suspension rate for the system that is optimal for the operator is between 10 and 25 pounds per inch. In this disclosure, the suspension rate is the amount of force that has to be exerted at the seat pivot rod to extend the spring or springs one inch. It will be understood by those with skill in the art that a suspension rate for the system is related to the spring rate of the spring or springs used in the system, the number of springs used in the system, and the installation ratio of the system. The installation ratio in this system is approximately the ratio of spring movement to seat movement. The installation ratio is created in part by the length of the lever arm from the pivot rod 40 to the seat pivot rod 46 as compared to the distance between the pivot rod 40 and the mounting rod 36. It can be appreciated that the installation ratio can be adapted by varying the length of the lever arm and the position of the mounting rod. It can further be seen that the suspension rate for the system can be adapted by varying the spring rate of the springs used in the system and/or by varying the number of springs used in the system, and/or installation ratio of the system. Thus, it will be appreciated that alternative spring rates, alternative numbers of springs, and alternative configurations of the pivot rod, lever bracket, and mounting rod can produce desirable suspension rates for the system in the range of 10 to 25 pounds per inch. Other ranges may also be acceptable for operator comfort as noted above, specifically between 5-50 pounds per inch. In one embodiment, two springs are used in the system, each having a spring rate of 179 pounds per inch with an installation ratio of 1:4.3. In other embodiments, the spring rate, the number of springs used, and the installation ratio may be altered to produce a suspension rate of the system that is acceptable to the operator.

As an operator prepares to utilize the seat suspension system, the knob 34 will be turned to preload the springs 30, 32 according to the operators mass. If the operator is heavier in nature, the springs will be stretched and preloaded. As an operator sits on the seat bottom 51, a downward force is exerted on the seat bottom 51. The initial extension/contraction of the springs is done to place the seat with the operator seated on it in the middle of the range of travel of the suspension system.

Figure 5:
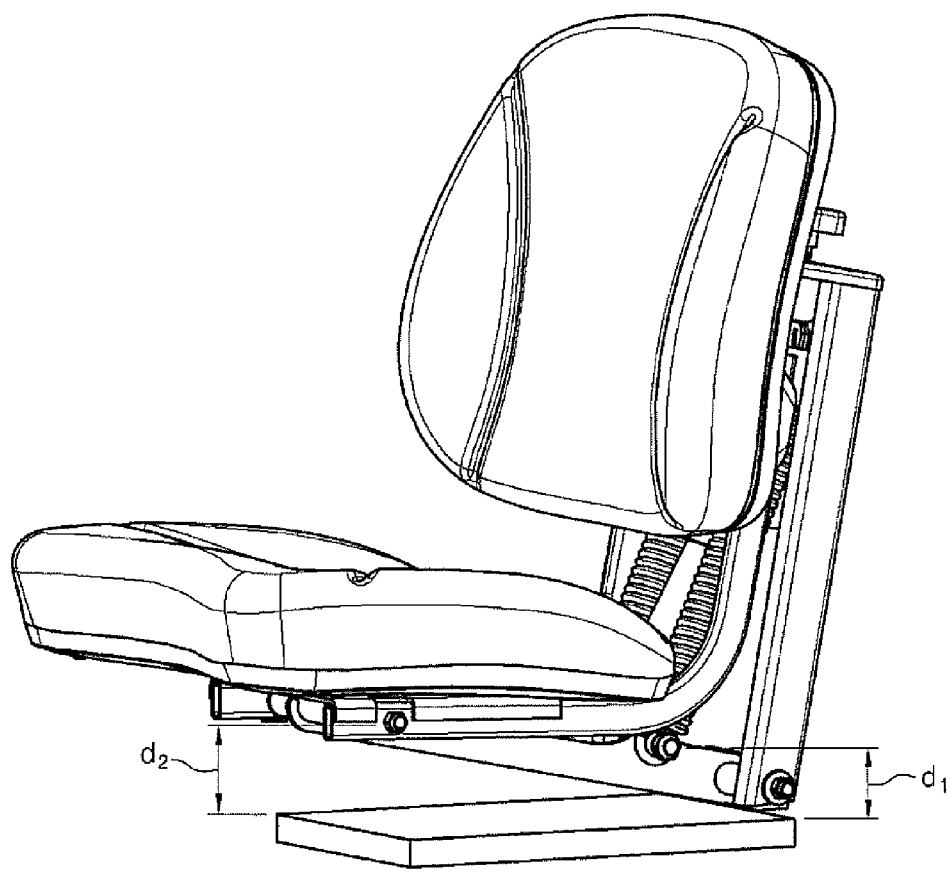
FIG. 5 is a perspective view depicting the deflection of the suspension system and vertical movement of the attached seat.

Referring now to FIGS. 1, 3 and 5, when the operator is seated in the seat and the vehicle is operated, the vehicle, including the seat attached thereto, will undergo movement and vibration. The movement will generate forces exerted on the seat suspension system. It can be appreciated that a downward force on the seat bottom 51 will exert a downward force on the lever bracket 38 at the end of the bracket distal from the pivot rod 40. As the force is applied to the distal end of the lever bracket, the lever bracket 38 will rotate around the pivot rod 40. The mounting rod 36, will also experience a downward force, but because it is located closer to the pivot rod 40, will not translate in the downward direction as much as the seat pivot rod 46 because it is located closer to the pivot rod 40, the fulcrum of the system, than the seat pivot rod 46. As the mounting rod 36 moves, the springs 30, 32 and the shock absorber 42 attached to the mounting rod 36 will undergo an extension and then a rebound compression after such extension. However, it can be appreciated that because the mounting rod 36 does not undergo the same degree of translation as the seat pivot rod 46, the movement of the springs is not a 1 to 1 ratio with the movement of the end of the lever bracket at the seat pivot rod 46 end. The ratio of spring movement to seat movement in one embodiment is approximately 1:4.3. When this ratio is used in a system with two springs having a spring rate of 179 pounds per inch, the suspension rate of the system is approximately 19.3 pounds per inch. Other ranges of ratios and spring rates are contemplated to provide an acceptable ride to the operator.

It can be appreciated that since the springs are not mounted directly to the seat frame that this disclosure contemplates a system that decreases the vibration and vibration acceleration experienced by the operator upon turbulence of the vehicle. The employment of a lever bracket and the indirect attachment of the springs to such bracket at a point near the fulcrum of the lever arm reduce the overall translation of the seat during such turbulence.

The foregoing detailed description of one or more embodiments of the suspension system has been presented herein by way of example and not limitation. It will be recognized that there are advantages to certain individual features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims.

The invention is claimed is:

1. A seat suspension system comprising:
   a system frame including a lower frame adapted to be mounted to a vehicle, and an upper frame wherein the lower frame and upper frame are connected via a pivot rod;
   an elongated lever bracket rotatably mounted at one end to the pivot rod and including a seat pivot rod at an opposite end;
   a spring carrier adjustably mounted to the upper frame wherein the distance of the spring carrier from the lower frame can be adjusted via a loading rod;
   two springs, each mounted at one end to the spring carrier and at an opposite end to a mounting rod secured to the lever bracket at a location on the lever bracket between the pivot rod and the seat pivot rod;
   a shock absorber mounted at one end to the mounting rod and at an opposite end to a damper mount separate from the spring carrier and attached to the upper frame at a fixed position relative to the spring carrier between the mounting rod and the spring carrier; and
   an L-shaped seat frame having a bottom portion of the L-shape pivotably mounted to the seat pivot rod and a rear portion of the L-shape bearing against rollers wherein the seat frame can move vertically with respect to the upper frame;
   wherein when downward force is exerted on said bottom portion of the L-shape, the lever bracket pivots about the axis of the pivot rod thereby causing the seat pivot rod to move toward the lower frame and the springs and shock absorber to extend.

2. The seat suspension system of claim 1, wherein said mounting rod is attached to said lever bracket at such a location that a force ranging between 5 and 50 pounds applied to said seat pivot rod causes an extension of the springs and shock absorber of approximately one inch.

3. The seat suspension system of claim 2, wherein a force between 10 and 25 pounds applied at said seat pivot rod causes approximately a one-inch extension of the springs and shock absorber.

4. The seat suspension system of claim 1, wherein the position of the spring carrier can be adjusted relative to the system frame such that the springs can be preloaded to accommodate force applied to the seat pivot rod.

* * * * *